Jan. 4, 1944.      R. A. A. WILLENS      2,338,221
TIMING MECHANISM
Filed April 18, 1940        3 Sheets-Sheet 1

Inventor:
R. A. A. WILLENS

Jan. 4, 1944.   R. A. A. WILLENS   2,338,221
TIMING MECHANISM
Filed April 18, 1940   3 Sheets-Sheet 2

Inventor:
R.A.A. WILLENS
Attorneys

Jan. 4, 1944.   R. A. A. WILLENS   2,338,221
TIMING MECHANISM
Filed April 18, 1940   3 Sheets-Sheet 3

Inventor:
R.A.A. WILLENS
Attorneys

Patented Jan. 4, 1944

2,338,221

UNITED STATES PATENT OFFICE 2,338,221

TIMING MECHANISM

Robert Alfred Archibald Willens, London, England, assignor to Celanese Corporation of America, a corporation of Delaware Application April 18, 1940, Serial No. 330,329
In Great Britain April 24, 1939

25 Claims. (Cl. 74—1)

This invention relates to timing mechanisms and is particularly concerned with a type of mechanism adapted to permit a given number of operations, e. g. a given number of revolutions of a timing shaft, to take place before effecting or initiating a motion to be timed in relation to said operations.

According to the invention, a timing mechanism comprises a plurality of units each consisting of a driving element, a driven element and an element hereafter referred to as an intermediate element, said elements being geared to one another so that if any one is held the other two may rotate in definite relationship to each other, said units being connected in series, driving element to driven element, and means for restricting the rotation of the several intermediate elements and of the last driven element of said series to any desired amount so as to permit any desired amount of rotation of the first driving element to take place. Preferably, the restricting means are adjustable so that the amount of rotation possible to the first driving element may be varied at will. Preferably also, there is a marked diminution or increase of speed between the successive driving and driven elements (the intermediate elements being held), whereby a large range of permissible rotations of the first driving element is available. The first driving element is driven in accordance with the operations in relation to which the timing is to be effected. Thus, it may be geared, in any suitable ratio, to a rotating shaft forming part of a mechanism by which such operations are performed, or to a timing shaft provided specially for the purpose.

A particularly convenient form of unit for the purposes of the invention is an epicyclic or differential gear comprising two sun gears and a rotatable frame or spider carrying one or more planet gears engaging with said sun gears. The unit may be in the form of a differential bevel gear unit, in which two sun gears are employed, and in which a planetary bevel gear or a number thereof engages with both sun gears. In this case one of the sun gears will generally form the driving element and the other the intermediate element, while the frame or spider carrying the planetary gear is the driven element. This gives a speed reduction between the driving and driven elements of 2:1.

The above arrangement is conveniently simple where a 2:1 ratio is sufficient. The arrangement has also the advantage that each intermediate element is either stationary or performs a single whole revolution, so that, after the desired interval has been measured, the apparatus may be so arranged as to proceed immediately to measure the same interval again, or a different interval if desired. When, however, there is time between successive intervals to be measured, for the timing mechanism to be reset, greater ratios than 2:1 may be used, whereby the number of units in series necessary for measuring a given maximum interval may be reduced. For this purpose it is preferable to use spur gears, there being two sun gears and one or more pairs of planetary gears, the gears of each pair being secured to the same shaft and engaging respectively with the two sun gears. In this case the two sun gears may serve as the driving and driven elements while the frame carrying the planetary gears serves as the intermediate element. By these means any desired ratio between the driving and the driven elements may be obtained a ratio equal to or slightly exceeding 10:1 being very convenient.

Some forms of apparatus according to the invention will now be described in greater detail with reference to the accompanying drawings in which.

Figure 1:
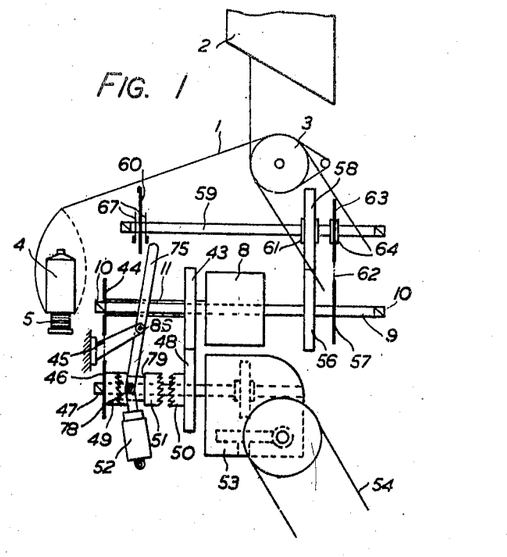
Fig. 1 is a diagrammatic side elevation.
Figure 2:
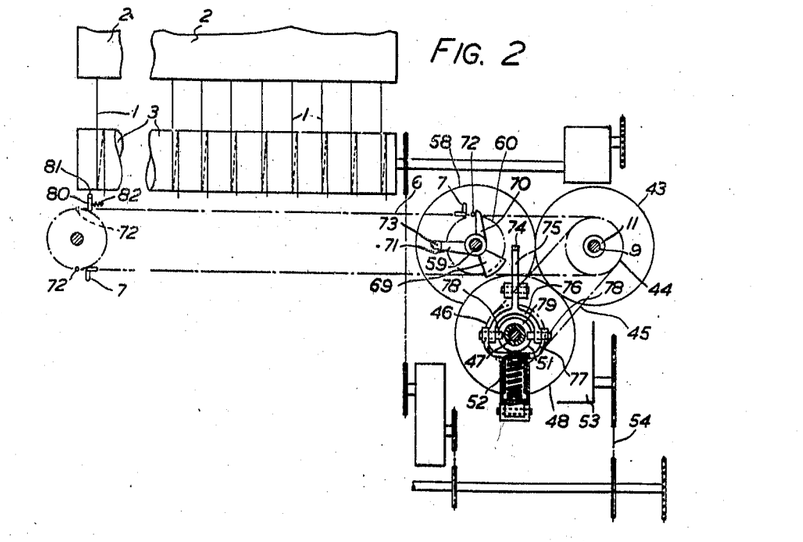
Fig. 2 is a front elevation of an artificial silk spinning machine employing the device according to the invention for timing the winding operation therein.
Figure 3:
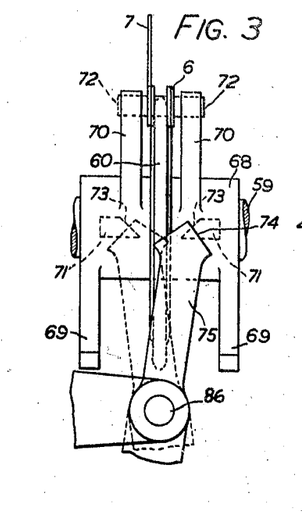
Fig. 3 shows a detail of Fig. 1 on a larger scale.

In Figs. 1 to 3, the mechanism according to the invention is shown as employed in an apparatus for the spinning of artificial silk by the dry or evaporative method, in which continuous filaments, indicated at 1 are produced in a spinning cabinet 2 at a rapid rate, are drawn from the spinning cabinet 2 by means of a feed roller 3 and are fed thereby to a cap spinning device 4 by means of which the continuous filaments are collected on a package 5.

In order to obtain uniformity in size of the package 5 of which a long series running the whole length of the machine is provided, a timing device according to the present invention is employed to facilitate the changing of the packages when they are full. This is done by means of a long chain, indicated at 6 in Fig. 2 running the whole length of the machine. The chain 6 has a projection 7 thereon, adapted to break the yarns 1, proceeding to the different spindles, successively at uniform time intervals of sufficient length to enable an operative to change the bobbin 5 at one spindle before proceeding to the next. By these means the changing of each of the spindles of the machine is effected at a definite time, and the amount of yarn 1 is caused to be substantially the same on each of the packages 5. Since, however, the time taken to form a full package 5 is very variable, depending particularly upon the fineness of the yarn being produced, it is not generally required that the operative, having changed spindles throughout the machine, should immediately go back to the beginning and start again. Accordingly, for timing the interval between the changing of the last spindle in one batch of yarn packages 5 and the changing of the first in the next batch, a mechanism according to the present invention indicated at 8 is employed. The mechanism, indicated at 8 in Fig. 1, comprises a central shaft 9 mounted in bearings 10, the details of the device 8 being shown in greater detail in Figs. 4–6. Surrounding the shaft 9 is a sleeve 11, the drive to the device 8 being applied to the sleeve 11. Two side-plates 12 and 13 are provided, the side-plate 12 being secured to the shaft 9 while the sleeve 11 emerges from the device through the side-plate 13. Inside the device the sleeve 11 carries a gear 14 engaging with a gear 15 mounted on a short shaft 16 carried by an arm 17 freely rotatable about the shaft 9. The other end of the shaft 16 carries a gear 18 which meshes with a gear 19 formed integral with a further gear 20, the gears 19, 20 together being freely rotatable about the shaft 9. The gear 20 engages with a gear 21 mounted on a short shaft 22 carried by an arm 23 freely rotatable about the shaft 9 the other end of the shaft 22 carrying a gear 24 engaging with a gear 25 secured to a third arm 26 freely rotatable therewith on the shaft 9. The gears 14 and 20 are the driving elements of the two units of the gear box, the arms 17 and 23 are the two intermediate elements, and the gear 19 and the gear 25 with the arm 26 are the two driven elements.

Figures 4, 5, 6:
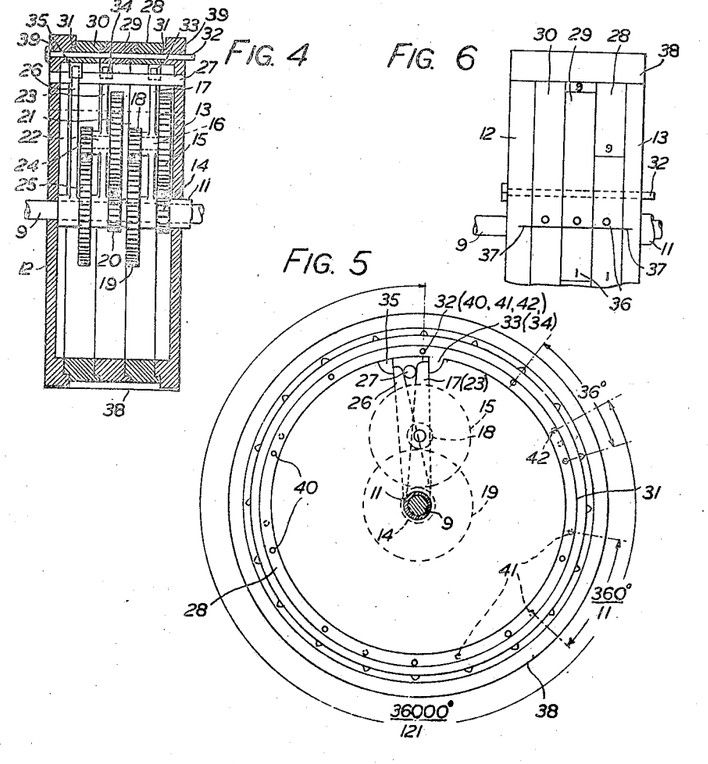
Figs. 4, 5 and 6 are a sectional view, a side elevation with side plate removed, and a part plan view respectively, showing in greater detail the timing device employed in the apparatus shown in Figs. 1 to 3.

A bar 27 extends through the gear box from the side-plate 12 to the side-plate 13 and serves as a back-stop for the three arms 17, 23 and 26, the arms 17 and 23 being disposed on one side of the bar 27 while the arm 26 is disposed on the other.

Disposed between the side-plates 12, 13 are three annuli 28, 29, 30, located by means of shoulders 31 on the annuli and the end plates 12, 13. The annuli 28, 29, 30 are capable of being independently rotated about the shaft 9 but in operation are held in position by means of a locking bar 32 passing through holes 39 in the side-plates 12, 13 and in the annuli 28, 29, 30, a plurality of holes being provided in each of the three annuli so that each of them may be fixed in each of a plurality of positions. Each of the annuli 28, 29, 30 surrounds one of the arms 17, 23, 26, and is provided with an inwardly projecting tooth, 33, 34, or 35 adapted to engage with the end of its arm and to prevent its rotation on such engagement. Each of the teeth 33, 34, 35 is disposed on the side of the corresponding arm remote from the back stop bar 27.

The gears 14, 15, 18, 19 are provided with such numbers of teeth that when the arm 17 is held stationary against either of the stops 27 or 33 one revolution of the gear 14 is adapted to produce 1/11 of a revolution of the gear 19. As a consequence of this if the gear 19 should be held stationary and the arm 17 should be free, one revolution of the gear 14 will produce 1/10 of a revolution of the arm 17 about the central shaft 9. The gears 20, 21, 24 and 25 are identical in magnitude with the gears 14, 15, 18, 19 respectively so that the same speed relationship holds between the gear 20, the arm 23 and the gear 25 as between the gear 14, the arm 17 and the gear 19.

Each of the arms 17, 23 and 26 may be held stationary or may be permitted by the position of its stop 33, 34 or 35 to rotate for a part of a revolution. The magnitude of this rotation is determined in each case by the position of the annulus 28, 29 or 30 and the stop 33, 34 or 35 thereon. This in turn depends upon the particular hole in the annulus through which the locking-rod 32 passes. In the annulus 28 there are ten such holes, 40, spaced apart at an angular distance of 1/10 of a revolution. Ten holes, 41, are provided on the second annulus 29 spaced apart at 1/11 of a revolution. Only two such holes, 42, are provided in the third annulus 30, being spaced apart at an angular distance of 100/121 of a revolution. In each annulus the first hole is so disposed with reference to its teeth 33, 34 or 35 that when the locking-bar 32 passes through that first hole the corresponding arm, 17, 23, or 26, is simultaneously engaged, on one side by the bar 27 and on the other side by the teeth 33, 34 or 35. Each annulus is inscribed externally with figures 36, as shown in Fig. 6 and, by bringing the appropriate figures in alignment with index marks 37 on the side-plates 12 and 13, the desired holes, 40, 41 or 42, may be brought into alignment with the holes 39 in the side-plates 12 and 13. A sheet metal casing 38 extending from the side-plate 12 to the side-plate 13 has a gap in the neighborhood of the index marks 37, so that the figures 36 may be seen and adjusted.

When the mechanism is first started all the arms 17, 23, 26 are held either against the back-stop bar 27 or against their respective teeth 33, 34, 35. For the purposes of the following description it will be assumed that the apparatus starts from the bar 27 the reverse operation of the timing mechanism, starting from the teeth 33, 34 and 35 being similar but in the opposite direction.

The timing mechanism has been set to give the desired interval by removing the locking-bar 32 and rotating each of the annuli 28, 29, 30 until the hole appropriate to the numebr of revolutions required is opposite the holes in the side-plates 12, 13. The bar 32 is replaced and locked in position. The first annulus 28 in its ten possible positions corresponding to the ten holes 40, permits any number of revolutions from 0 to 9, which figures are marked at 36 on the annulus 28 as shown in Fig. 6. The second annulus 29 permits any number of tens of revolutions from 0 to 90. The third annulus, having only two holes 42 permit either 0 or 100 revolutions of the collar 11.

When the collar 11 begins the revolutions to be counted the arms 17, 23, 26 leave the back-stop bar 27, the order in which they leave it being indefinite and immaterial. When the desired number of revolutions of the collar 11 is completed each of the arms 17, 23, 26, is brought up against its tooth 33, 34 or 35 and the internal gears of the device cannot rotate any further independently of the rest of the timing device 8. In consequence the drive is transmitted to the shaft 9, the whole device 8 rotating with the collar 11 and the shaft 9. If the motion of the collar 11 is now reversed there is no further tendency to drive the shaft 9 since the internal gears of the device 8 are free to rotate in the opposite direction, which they do until they have again completed the predetermined number of revolutions. Then, when they have all returned to the back-stop bar 27 the drive is again transmitted to the shaft 9.

The application of this device to the mechanism shown in Figs. 1 to 3 is as follows: The timing device 8 is driven (as shown in Fig. 1) either by means of a gear 43 or by means of a sprocket 44 both of which are secured to the collar 11. The sprocket 44 is connected by means of a chain 45 to a sprocket 46 mounted freely on a shaft 47 and the gear 43 engages directly with a gear 48 also mounted freely on the shaft 47. The sprocket 46 and the gear 48 each carry clutch members 49, 50 with axially facing teeth, adapted to engage with a middle clutch member 51 splined to the shaft 47 and held in engagement with one or other of the members 49, 50 by means of a toggle mechanism 52. The shaft 47 is driven at a low speed (about one revolution per minute) by means of a reduction gear 53 connected by means of a chain 54 to the main drive of the machine. The shaft 9 carries a gear 56 and a sprocket 57 secured thereto (Fig. 1) the gear 56 engaging with a gear 58 mounted on a shaft 59 carrying a chain sprocket 60 driving the breaker-chain 6. A free-wheel gear 61 is interposed between the gear 58 and the shaft 59 so that when the gear 58 is driven in one direction it drives the shaft 59 and when it is driven in the other direction it merely idles. The sprocket 57 is connected by means of a chain 62 to a sprocket 63 mounted by means of a free-wheel gear 64 similar to the free-wheel gear 61 on the same shaft 59, the free-wheel gear 64 being adapted to drive the shaft 59 in the same direction as the free-wheel gear 61. It will be seen that, in whichever direction the shaft 9 is rotated it will drive the shaft 59 always in the same direction, either through the gears 56, 58 and the free-wheel 61 or through the sprockets 57, 63, chain 62 and free-wheel 64.

Associated with the sprocket 60 driving the chain 6 are a pair of members, indicated generally at 67 in Fig. 1 and shown in greater detail in Figs. 2 and 3. The members 67 each comprise a collar 68, freely surrounding the shaft 59, on which are mounted a weight 69, a lever 70 and a lever 71 at right angles to the lever 70. On the chain 6 are provided laterally projecting pins 72 each adapted to engage with one of the levers 70. Two such pins 72 are provided on the chain, at equal distances apart, so that when one pin is at one end of the machine the other pin is at the other. The two pins 72 project in opposite directions from the chain 6 so that one engages one of the members 67 and the other the other. The pin 72 shown dotted on the left-hand side of Fig. 2 is in its initial position when the chain begins to be driven. When the chain has completed its run the pin 72 occupies the position shown in full on the right-hand side of Fig. 2, when it engages the lever 70 and causes the member 67 to rotate with the sprocket 60 driving the chain 6. As the member 67 rotates it brings over the lever 71 which is provided with a sloping ramp 73 (Fig. 3) adapted to engage with a sloping surface 74 on the upper end of a lever 75 pivoted at 86 to a stationary part of the machine. The lower end of the lever 75 is in the form of a fork 76, connected to a fork 77 forming the upper part of the toggle member 52 by means of two pins 78 projecting into a groove 79 round the middle clutch member 51. The groove 79, as is shown in Fig. 1, is of sufficient width to allow the pins 78 and the lever 79 and toggle 52 to move to their mid-position under the influence of the surface 73 or the lever 71 acting on the sloping surface 74. When the lever 75 has been pushed beyond its mid-position by the lever 71 it snaps over under the action of the toggle mechanism 52, the pins 78 engaging with the other side of the groove 79 and shifting the member 51 from its engagement with one of the members 49, 50 to the other. The upper end of the lever 75 having been moved over by the toggle mechanism 52, the sloping surface 74 leaves its engagement with the sloping surface 73 so that the whole member 67 is free to rotate under the action of the weight 79 to its normal position.

The shifting of the member 51 from its engagement with one of the members 49 to its engagement with the other, 50, reverses the direction of rotation of the sleeve 11. When this is done, the gears within the timing-box 8 are free to rotate so that the drive to the shaft 9 ceases and consequently shaft 59 and gear 60 cease to rotate. In order to ensure the cessation of rotation of these elements a spring-loaded finger 80, pivoted at 81 and backed by a spring 82 is provided at the left-hand end of the machine to hold the pin 72.

In the manner previously described, the sleeve 11 continues to rotate until the desired number of revolutions have been completed, during which time the yarn 1 is collected on the bobbins 5. When the desired number of revolutions has been completed the gears in the timing-box 8 cease to rotate independently of the box itself so that the box itself and the shaft 9 are forced to rotate. This again drives the chain 6 through the medium of the sprocket 60 and either the gears 56, 58, or the sprockets 57, 63, and the chain 62. The positive driving of the chain 6 drives the pin 72 past the spring-loaded stop member 80 and carries the finger 7 along the length of the machine, breaking successively the yarns 1 proceeding to the different packages 5. The operative follows up the pin 7 and changes each package 5 as soon as the yarn 1 being fed to it is broken. When the pin 7 has completed its journey along the machine and all the packages 5 have been changed, the pin 72 engages with the other of the members 67 and reverses the direction of drive of the sleeve 11 in a manner similar to that described above.

In this way, each package is wound for a definite time, or more correctly for a definite number of revolutions of the main drive driving the reduction gear 53, the main drive being assumed to be constant in speed. The total time is equal to the time taken by the chain 6 to complete the run of the pin 7 along the machine (e. g. in a 90-spindle machine requiring 20 seconds per spindle to change, a time of approximately 30 minutes) plus the interval timed by the device 8. This interval may be adjusted, in accordance with the denier of the yarn and the size of the package required, by adjusting the positions of the annuli 28, 29, 30.

Figure 7:
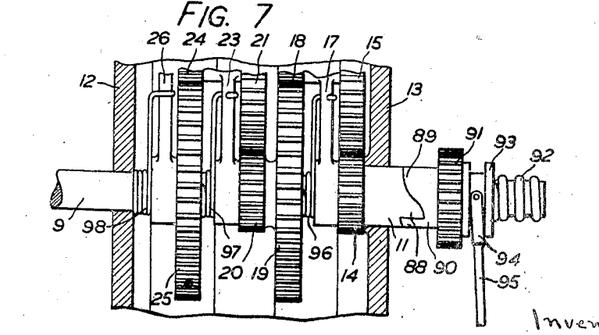
Fig. 7 shows some alternative details of the apparatus shown in Fig. 4.

The timing box 8 shown in Figs. 1 to 6 is arranged so as to be rotated alternately in opposite directions. In using the device in other conditions, however, it may be desired to drive the box always in the same direction and for this purpose the arrangement shown in Fig. 7 may be employed. In this case the sleeve 11 is driven by means of an inverted ratchet dog-clutch, teeth 88 being provided on the end of the sleeve 11 to engage with teeth 89 on a further sleeve 90 rotating on the shaft 9. The sleeve 90 is driven, in an anticlockwise direction as viewed from the right, by means of a pinion 91 and the teeth 88, 89 are held in engagement with one another by means of a spring 92. In this case when the arms, 17, 23 and 26 come up against their stops 33, 34 and 35 the sleeve 11 is no longer capable of rotating so that the member 90 rides away from the sleeve 11 against the action of the spring 92. A collar 93 and fork 94 on a lever 95 transmit the motion of the member 90 to initiate the operation being controlled by the timing device, means being provided, e. g. some form of toggle, to carry the teeth 89 clear of teeth 88. Each of the arms 17, 23, 26 is provided with a spring 96, 97 or 98 secured to the shaft 9 and tending to force the arms away from their teeth 33, 34 or 35 and against the back-stop 27. When the teeth 89 are clear of the teeth 88 these springs come into action and reset the device, bringing all the arms 17, 23, 26 against the back-stop 27. When the desired movement, initiated by the motion of the lever 95, is completed the lever 95 is moved back by any convenient mechanism so that the teeth 88, 89 are re-engaged and timing through the timing device begins once more.

Figure 8:
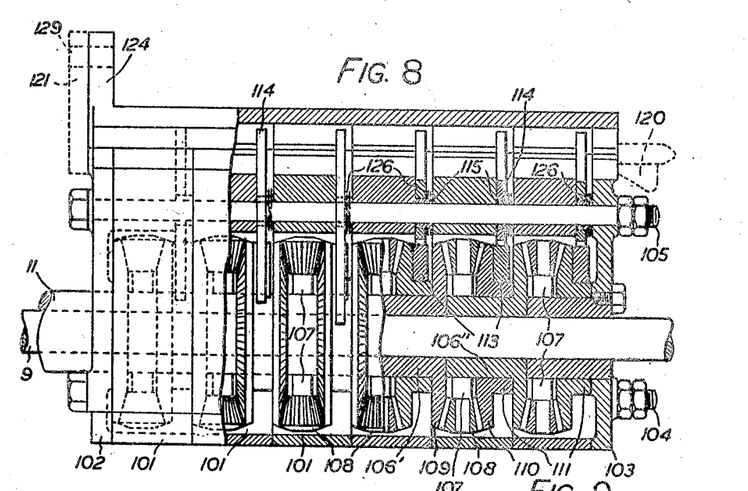
Fig. 8 is a longitudinal elevation partly in section of a further form of timing device in accordance with the invention.

Figs. 8 to 11 show a different form of timing device in accordance with the present invention. In this device again there is provided a central shaft 9 running through the whole device and a sleeve 11 constituting the drive of the device. In this case the device consists of a series of six differential gears each contained within sections 101 of a casing for the whole device, the six sections 101 of casing being bolted together between end-plates 102, 103 by means of two bolts 104 and a bolt 105. The extreme left-hand part of Fig. 8 shows the device in full with some of the internal gear dotted, the middle part shows a partial section of the device with the casing broken away and the right-hand part shows a full section of the device.

Each of the differentials comprises a sleeve 106, which carries two or more short shafts 107 projecting radially from it, a bevel gear 108 being mounted on the end of each shaft 107. The bevel gears 108 engage with a bevel gear 109 integral with the sleeve 106 of the preceding differential gear or, in the case of the first bevel gear 109, with the sleeve 11. The bevel gears 108 engage also with a bevel gear 110 integral with a sleeve 111 and freely rotatable on the sleeve 106. Each of the bevel gears 110 is provided with means, to be described hereafter, whereby it may either be held stationary or may be permitted to perform a single revolution and no more. The gear 109 (connected to the sleeve 106 of the preceding unit or to the sleeve 11) is the driving element of the unit, the sleeve 106, with shafts 107 and bevel gears 108, is the driven element, and the gear 110 is the intermediate element.

It will be seen that when for example, the bevel gear 110 mounted in the sleeve 106″ is held stationary a single rotation of the sleeve 106′ of the previous differential gear, through the medium of the bevel gears 108, brings about a half-revolution of the sleeve 106′ on which the stationary gear 110 is freely mounted. If on the other hand the gear 110 is free to rotate and the sleeve 106″ is fixed, a single revolution of the sleeve 106′ in the preceding differential will bring about the single rotation permitted to the gear 110. Thus, if all the gears 110 except the first are held stationary a single rotation of the sleeve 11 will bring about a single rotation (in the opposite direction) of the first bevel 110. If, however, all the bevel gears 110 except the second are held stationary a single rotation of the sleeve 11 will bring about a half-revolution of the first sleeve 106, which in turn will bring about a half-revolution (in the opposite direction) of the second gear 110; thus two revolutions of the shaft 11 would be required to bring about one revolution of the second gear 110. If, now, the first two bevel gears 110 are free and the rest are fixed the number of revolutions of the sleeve 11 required to rotate both the first two bevel gears 110 for one revolution is equal to the sum of the revolutions of the sleeve 11 required for each, that is three revolutions. Similarly the third gear 110 requires four revolutions of the sleeve 11 to turn it through one revolution, the fourth gear 110 requires eight revolutions, the fifth gear 110 sixteen revolutions, and the sixth gear 110 thirty-two revolutions. If any combination of the gears 110 are free to rotate the number of revolutions of the shaft 11 required to rotate them all through one revolution is equal to the sum of the number of revolutions required for each. By locking a suitable selection of the gears 110 and permitting the rest to rotate one revolution only any number of revolutions of the sleeve 11 from 0 to 63 may be permitted. Thus forty-seven revolutions of the sleeve 11 may be permitted by allowing the last bevel gear 110 (thirty-two revolutions) and the first four bevel gears 110 (1, 2, 4 and 8 revolutions respectively, totalling 15) to rotate one revolution each.

Figure 9:
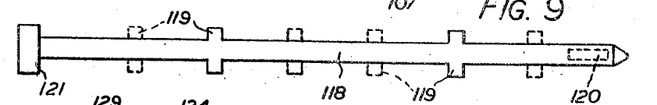
Fig. 9 is a plan view of a key employed in the apparatus shown in Fig. 8.
Figure 10:
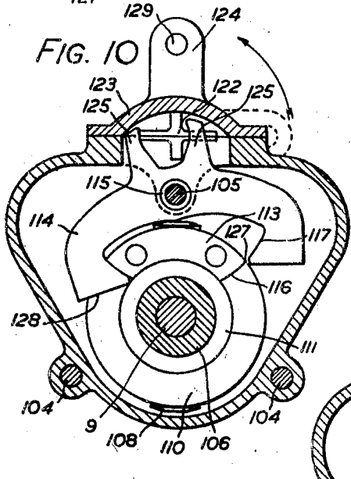
Fig. 10 is a lateral sectional elevation of the apparatus shown in Fig. 9.
Figure 11:
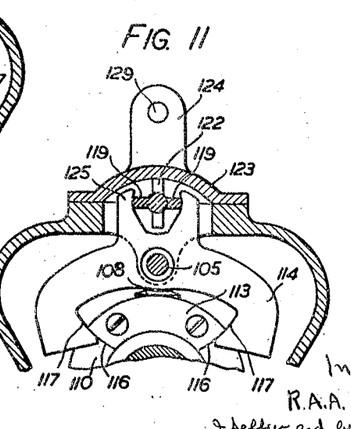
Fig. 11 shows part of the mechanism of Fig. 10 in a different position.

In order to lock the bevel gears 110 or to allow them to rotate for one revolution only, the mechanism shown in Figs. 9 to 11 is employed. Each gear 110 is provided on its back with a segmental block 113 adapted to be engaged by a lever 114 rotatably mounted on a spacing-piece 115 on the bolt 105. The ends 116 of the segments 113 and the inner surfaces 117 of the lever 114, are struck on a radius about the centre of the bolt 105 so that one or both of the surfaces 117 is in engagement with one or both of the surfaces 116, the gear 110 being locked if both pairs of surfaces are engaged, and free to rotate in one direction only if one pair of surfaces are engaged. The lever 114 may be brought to the position shown in Fig. 11, where both pairs of surfaces 117, 118 are engaged by means of a key shown in Fig. 9. The key comprises a shank 118 bearing pairs of horizontal wards 119, an end ward 120 and a handle 121. In Fig. 9 two pairs of wards 119 are shown in full and four pairs are shown dotted completing the six possible positions in which wards might be provided. A cruciform keyhole 122 is provided between the series of casing members 101 and a cover-plate 123. The key, with the handle 121 and the ward 120 in a horizontal position is pushed into the keyhole 122 and when it is fully engaged is turned so that the handle 121 coincides with a lug 124 on the cover 123 where it is locked by a padlock or the like through the hole 129. This position is indicated in Fig. 8, in which, while the main part of the key is omitted for clarity, the ends 120, 121, are shown dotted in the operative position. It will be seen from Fig. 8 that in this position the ward 120 lies just outside the end-plate 103. The result of turning the key through a quarter revolution is shown in Fig. 11, in which it will be seen that the horizontal wards 119 have engaged with upstanding portions 125 of the lever 114 and have brought the lever 114 into a symmetrical position.

In the manner described above certain of the levers 114 are locked while the rest (corresponding to the dotted wards 119 on Fig. 9) are free. The free levers 114, however, are held from casual rotation by means of spring-washers 126. These levers 114 occupy the position shown in Fig. 10 and it will be seen that in this position the corresponding gear 110 is free to rotate in a clockwise direction. As it completes its rotation, however, the outer corner 127 of the segment 113 will engage with a surface 128 on the other end of the lever 114 and will rotate the lever 114 to the opposite position to that shown in Fig. 10. In this way when the gear 110 has completed one revolution the surfaces 116, 117 on the right of Fig. 10 will come into engagement and a further rotation of the gear 110 will be prevented. When, in the driving of the sleeve 11, all the free gears 110 have completed one revolution they will all be brought to rest, the interval to be timed having then been completed. With the key shown in Fig. 9 this interval is equal to 45 revolutions of the sleeve 11, 1, 4, 8 and 32 revolutions respectively for the first, third, fourth and sixth pairs of wards omitted therefrom. At this stage, or after any suitable operation initiated at the end of the interval has been performed, the direction of rotation of the shaft 11 may be reversed, for example as described with reference to Figs. 1 to 3, though in such a case it would be desirable to provide balance weights to balance the whole device about the shaft 9 during the driving of the chain 6. The positions of all the free levers 114 having been reversed, all the free gears 110 are now free to make a single revolution in an anti-clockwise direction in response to the reverse motion of the sleeve 11, so that the timed interval may be repeated as many times as desired, the sleeve 11 rotating alternately in opposite directions.

It will be noted that when the interval to be timed is to be changed the key shown in Fig. 9 must be removed and another key having a different combination of wards substituted for it. In removing the key 9 the handle 121 must be rotated a quarter revolution to the left or to the right, depending upon the positions of the free levers 114 at the time of changing. The key is so arranged that it cannot be removed in the wrong position. Thus, if the free levers 114 are in the position shown in Fig. 10 the handle 121 of the key must be rotated to the right; otherwise the vertical ward 120 when moved to the horizontal position will foul the right-hand members 125 of the free levers 114. The ward 120 is arranged, however, so that on whichever side it is, it will push any lever 114 in the middle position to the same side as the free levers 114. In this way it is ensured that when the key is changed all the free levers 114 are in a correct position for the continuance of the operation, the locked levers having been pushed from this position to the mean position by the rotation of the new key. It will be understood that, instead of driving the device alternately in opposite directions, means may be provided (e. g., a key rotated once at the end of each cycle, or springs applied to the levers 14, as to the levers 17, 23 and 26 in Fig. 7) to restore the free levers 14 to their original position at the end of an operation, so that the device may be driven always in the same direction in successive timed intervals.

Having described my invention, what I desire to secure by Letters Patent is:

1. A timing mechanism comprising a plurality of units each consisting of a driving element, a driven element and an intermediate element, said elements being geared to one another so that if any one is held the other two may rotate in definite relationship to each other, said units being connected in series, driving element to driven element, and means for restricting the rotation of the several intermediate elements and of the last driven element of said series to any desired amount so as to permit any desired amount of rotation of the first driving element to take place.

2. A timing mechanism comprising a plurality of units each consisting of a driving element, a driven element and an intermediate element, said elements being geared to one another so that if any one is held the other two may rotate in definite relationship to each other, said units being connected in series, driving element to driven element, and adjustable means for restricting the rotation of the several intermediate elements and of the last driven element of said series to any desired and adjustable amount so as to permit any desired amount of rotation of the first driving element to take place.

3. A timing mechanism comprising a plurality of units each consisting of a driving element, a driven element and an intermediate element, said elements being geared to one another so that if any one is held the other two may rotate in definite speed ratio to each other, said ratio between said driving and driven elements being a large ratio, said units being connected in series, driving element to driven element, and adjustable means for restricting the rotation of the several intermediate elements and of the last driven element of said series to any desired and adjustable amount so as to permit any desired amount of rotation of the first driving element to take place.

4. A timing mechanism comprising a plurality of units each consisting of two sun-gears and a rotatable member carrying a planetary gear system engaging with both said sun-gears, said sun-gears and said rotatable member constituting a driving element, a driven element and an intermediate element which are geared to one another so that if any one is held the other two may rotate in definite relationship to each other, said units being connected in series, driving element to driven element, and adjustable means for restricting the rotation of the several intermediate elements and of the last driven element of said series to any desired and adjustable amount so as to permit any desired amount of rotation of the first driving element to take place.

5. A timing mechanism comprising a plurality of units each consisting of two sun-gears and a rotatable member carrying a planetary gear system engaging with both said sun-gears, said sun-gears and said rotatable member constituting a driving element, a driven element and an intermediate element which are geared to one another so that if any one is held the other two may rotate in definite speed ratio to each other, said ratio between said driving and driven elements being a large ratio, said units being connected in series, driving element to driven element, and adjustable means for restricting the rotation of the several intermediate elements and of the last driven element of said series to any desired and adjustable amount so as to permit any desired amount of rotation of the first driving element to take place.

6. A timing mechanism comprising a plurality of units each consisting of a driving element in the form of a bevel gear, an intermediate element in the form of another bevel gear, said bevel gears being sun-gears, and a driven element in the form of a rotatable member carrying at least one planetary bevel gear engaging with both said sun-gears, whereby said elements are geared together so that if any one is held the other two may rotate in definite relationship to each other, said units being connected in series, driving element to driven element, and adjustable means for restricting the rotation of the several intermediate elements and of the last driven element of said series to any desired and adjustable amount so as to permit any desired amount of rotation of the first driving element to take place.

7. A timing mechanism comprising a plurality of units each consisting of a driving element in the form of a bevel gear, an intermediate element in the form of another bevel gear, said bevel gears being sun-gears, and a driven element in the form of a rotatable member carrying at least one planetary bevel gear engaging with both said sun-gears, whereby said elements are geared together so that if any one is held the other two may rotate in definite relationship to each other, said units being connected in series, driving element to driven element, and, in connection with each of the several intermediate elements and the last driven element, locking means adjustable so as either to lock its element or to permit its element to perform a single revolution so as to permit any desired amount of rotation of the first driving element to take place.

8. A timing mechanism comprising a plurality of units each consisting of a spur gear constituting a driving element, a spur gear constituting a driven element, both said spur gears being sun-gears, and an intermediate element in the form of a rotatable member carrying at least one pair of connected planetary spur gears each engaging with one of said sun-gears, whereby said elements are geared to one another so that if any one is held the other two may rotate in definite speed ratio to each other, said ratio between said driving and driven elements being a large ratio, said units being connected in series, driving element to driven element, and adjustable means for restricting the rotation of the several intermediate elements and of the last driven element of said series to any desired and adjustable amount so as to permit any desired amount of rotation of the first driving element to take place.

9. A timing mechanism comprising a plurality of units each consisting of a spur gear constituting a driving element, a spur gear constituting a driven element, both said spur gears being sun-gears, and an intermediate element in the form of a rotatable member carrying at least one pair of connected planetary spur gears each engaging with one of said sun-gears, whereby said elements are geared to one another so that if any one is held the other two may rotate in definite speed ratio to each other, said ratio between said driving and driven elements being a large ratio, said units being connected in series, driving element to driven element, an annulus surrounding each of said intermediate elements and the last driven element, a stop on each of said annuli adapted to limit the motion of the corresponding element, each annulus being rotatable so as to bring its stop to any selected position, and means for locking the several annuli in their selected positions, whereby said stops restrict the rotation of the several intermediate elements and of the last driven element of said series to any desired amount so as to permit any desired amount of rotation of the first driving element to take place.

10. A timing mechanism comprising a plurality of units each consisting of a driving element, a driven element and an intermediate element, said elements being geared to one another so that if any one is held the other two may rotate in definite relationship to each other, said units being connected in series, driving element to driven element, means for restricting the rotation of the several intermediate elements and of the last driven element of said series to any desired amount so as to permit any desired amount of rotation of the first driving element to take place, and a drive to the first driving member capable of being broken when opposed by the resistance occurring when said first driving element has rotated the desired amount.

11. A timing mechanism comprising a plurality of units each consisting of a driving element in the form of a bevel gear, an intermediate element in the form of another bevel gear, said bevel gears being sun-gears, and a driven element in the form of a rotatable member carrying at least one planetary bevel gear engaging with both said sun-gears, whereby said elements are geared together so that if any one is held the other two may rotate in definite relationship to each other, said units being connected in series, driving element to driven element, locking means in connection with each of the several intermediate elements and the last driven element, said locking means being adjustable either to lock its element or to permit its element to perform a single revolution so as to permit any desired amount of rotation of the first driving element to take place, and a drive to the first driving member capable of being broken when opposed by the resistance occurring when said first driving element has rotated the desired amount.

12. A timing mechanism comprising a plurality of units each consisting of a spur gear constituting a driving element, a spur gear constituting a driven element, both said spur gears being sun-gears, and an intermediate element in the form of a rotatable member carrying at least one pair of connected planetary spur gears each engaging with one of said sun-gears, whereby said elements are geared to one another so that if any one is held the other two may rotate in definite speed ratio to each other, said ratio between said driving and driven elements being a large ratio, said units being connected in series, driving element to driven element, an annulus surrounding each of said intermediate elements and the last driven element, a stop on each of said annuli adapted to limit the motion of the corresponding element, each annulus being rotatable so as to bring its stop to any selected position, means for locking the several annuli in their selected positions, whereby said stops restrict the rotation of the several intermediate elements and of the last driven element of said series to any desired amount, so as to permit any desired amount of rotation of the first driving element to take place, and a drive to the first driving element capable of being broken when opposed by the resistance occurring when said first driving element has rotated the desired amount.

13. A timing mechanism comprising a plurality of units each consisting of a driving element, a driven element and an intermediate element, said elements being geared to one another so that if any one is held the other two may rotate in definite relationship to each other, said units being connected in series, driving element to driven element, means for restricting the rotation of the several intermediate elements and of the last driven element of said series to any desired amount so as to permit any desired amount of rotation of the first driving element to take place, a drive to the first driving element capable of being broken when opposed by the resistance occurring when said first driving element has rotated the desired amount, and a spring in connection with each of the intermediate elements and the last driven element, said spring being adapted to resist the rotation of its element and, when the drive to the first driving element is broken, to return its element to its initial position.

14. A timing mechanism comprising a plurality of units each consisting of a driving element, a driven element and an intermediate element, said elements being geared to one another so that if any one is held the other two may rotate in definite relationship to each other, said units being connected in series, driving element to driven element, means for restricting the rotation of the several intermediate elements and of the last driven element of said series to any desired amount so as to permit any desired amount of rotation of the first driving element to take place, and means for reversing the drive to the first driving element after it has rotated the desired amount so that it then rotates an equal amount in the opposite direction.

15. A timing mechanism comprising a plurality of units each consisting of a driving element in the form of a bevel gear, an intermediate element in the form of another bevel gear, said bevel gears being sun-gears, and a driven element in the form of a rotatable member carrying at least one planetary bevel gear engaging with both said sun-gears, whereby said elements are geared together so that if any one is held the other two may rotate in definite relationship to each other, said units being connected in series, driving element to driven element, locking means in connection with each of the several intermediate elements and the last driven element, said locking means being adjustable either to lock its element or to permit its element to perform a single revolution so as to permit any desired amount of rotation of the first driving element to take place, and means for reversing the drive to the first driving element after it has rotated the desired amount so that it then rotates an equal amount in the opposite direction.

16. A timing mechanism comprising a plurality of units each consisting of a spur gear constituting a driving element, a spur gear constituting a driven element, both said spur gears being sun-gears, and an intermediate element in the form of a rotatable member carrying at least one pair of connected planetary spur gears, each engaging with one of said sun-gears, whereby said elements are geared to one another so that if any one is held the other two may rotate in definite speed ratio to each other, said ratio between said driving and driven elements being a large ratio, said units being connected in series, driving element to driven element, an annulus surrounding each of said intermediate elements and the last driven element, a stop on each of said annuli adapted to limit the motion of the corresponding element, each annulus being rotatable so as to bring its stop to any selected position, means for locking the several annuli in their selected positions, whereby said stops restrict the rotation of the several intermediate elements and of the last driven element of said series to any desired amount so as to permit any desired amount of rotation of the first driving element to take place, and means for reversing the drive to the first driving element after it has rotated the desired amount so that it then rotates an equal amount in the opposite direction.

17. A timing mechanism comprising a plurality of units each consisting of a driving element in the form of a bevel gear, an intermediate element in the form of another bevel gear, said bevel gears being sun-gears, and a driven element in the form of a rotatable member carrying at least one planetary bevel gear engaging with both said sun-gears, whereby said elements are geared together so that if any one is held the other two may rotate in definite relationship to each other, said units being connected in series, driving element to driven element, a projection on each intermediate element, a double-ended lever having three positions in which it is adapted to engage one or the other or both sides of said projection with one or the other or both of its ends when said element is in its zero position, means for locking selected levers in the last-mentioned of said three positions so as to lock the corresponding elements in zero position, each projection being adapted, during the rotation of its element, to engage one end of its lever, and move it to a position where the other end of said lever may engage and stop said projection when said element is next in zero position.

18. A timing mechanism comprising a plurality of units each consisting of a driving element, a driven element and an intermediate element, said elements being geared to one another so that if any one is held the other two may rotate in definite relationship to each other, said units being connected in series, driving element to driven element, adjustable means for restricting the rotation of the several intermediate elements and of the last driven element of said series to any desired and adjustable amount so as to permit any desired amount of rotation of the first driving element to take place, and a key having a form corresponding to a desired amount of rotation and adapted on insertion into the mechanism to lock selected restricting means in a desired position.

19. A timing mechanism comprising a plurality of units each consisting of a driving element in the form of a bevel gear, an intermediate element in the form of another bevel gear, said bevel gears being sun-gears, and a driven element in the form of a rotatable member carrying at least one planetary bevel gear engaging with both said sun-gears, whereby said elements are geared together so that if any one is held the other two may rotate in definite relationship to each other, said units being connected in series, driving element to driven element, a projection on each intermediate element, a double-ended lever having three positions in which it is adapted to engage one or the other or both sides of said projection with one or the other or both of its ends when said element is in its zero position and a key having a form corresponding to a desired amount of rotation of the first driving element and adapted to lock selected levers in the last-mentioned of said three positions so as to lock the corresponding elements in zero position, each projection being adapted, during the rotation of its element, to engage one end of its lever, and move it to a position where the other end of said lever may engage and stop said projection when said element is next in zero position.

20. Apparatus for executing a series of operations repeatedly at uniform intervals, comprising as a timing mechanism a plurality of units each consisting of a driving element, a driven element and an intermediate element, said elements being geared to one another so that if any one is held the other two may rotate in definite relationship to each other, said units being connected in series, driving element to driven element, and means for restricting the rotation of the several intermediate elements and of the last driven element of said series to any desired amount so as to permit any desired amount of rotation of the first driving element relatively to said restricting means to take place, said apparatus further comprising means, adapted to be actuated each time said desired amount of rotation is completed for effecting said series of operations, and means for initiating anew said desired amount of rotation each time said series of operations is completed.

21. Apparatus for executing a series of operations repeatedly at uniform intervals, comprising as a timing mechanism a plurality of units each consisting of a driving element, a driven element and an intermediate element, said elements being geared to one another so that if any one is held the other two may rotate in definite relationship to each other, said units being connected in series, driving elements to driven element, and means for restricting the rotation of the several intermediate elements and of the last driven element of said series to any desired amount so as to permit any desired amount of rotation of the first driving element relatively to said restricting means to take place and then to cause said driving element to drive said restricting means, said apparatus further comprising means driven by the rotation of said restricting means for effecting said series of operations and means for initiating anew said desired amount of rotation each time said series of operations is completed.

22. Apparatus for executing a series of operations repeatedly at uniform intervals comprising as a timing mechanism a plurality of units each consisting of a driving element, a driven element and an intermediate element, said elements being geared to one another so that if any one is held the other two may rotate in definite relationship to each other, said units being connected in series, driving element to driven element, and means for restricting the rotation of the several intermediate elements and of the last driven element of said series to any desired amount so as to permit any desired amount of rotation of the first driving element relatively to said restricting means to take place and then to cause said driving element to drive said restricting means, said apparatus further comprising means adapted to be driven always in one direction by rotation of said restricting means in either direction and to effect said series of operations, and means for reversing the drive of said first driving element each time said series of operations is completed.

23. Apparatus for executing a series of operations repeatedly at uniform intervals comprising as a timing mechanism a plurality of units each consisting of a spur gear constituting a driving element, a spur gear constituting a driven element, both said spur gears being sun-gears, and an intermediate element in the form of rotatable member carrying at least one pair of connected planetary spur gears each engaging with one of said sun-gears, whereby said elements are geared to one another so that if any one is held the other two may rotate in definite speed ratio to each other, said ratio between said driving and driven elements being a large ratio, said units being connected in series, driving element to driven element, an annulus surrounding each of said intermediate elements and the last driven element, a stop on each of said annuli adapted to limit the motion of the corresponding element, said annulus being rotatable so as to bring said stop to any selected position, and means for locking the several annuli in their selected positions, whereby said stops restrict the rotation of the several intermediate elements and of the last driven element of said series to any desired amount so as to permit any desired amount of rotation of the first driving element relatively to said annuli to take place and then to cause said driving element to drive said annuli, said apparatus further comprising means adapted to be driven always in one direction by rotation of said annuli in either direction and to effect said series of operations, and means for reversing the drive of said first driving element each time said series of operations is completed.

24. Apparatus for executing a series of operations repeatedly at uniform intervals, comprising as a timing mechanism a plurality of units each consisting of a driving element, a driven element and an intermediate element, said elements being geared to one another so that if any one is held the other two may rotate in definite relationship to each other, said units being connected in series, driving element to driven element, and means for restricting the rotation of the several intermediate elements and of the last driven element of said series to any desired amount so as to permit any desired amount of rotation of the first driving element relatively to said restricting means to take place and then to cause said driving element to drive said restricting means, said apparatus further comprising a chain having a run passing a series of stations at which said series of operations are to be executed, means on said chain to execute an operation at one of said stations as said means pass said station, a driving connection between said chain and said restricting means adapted to drive said chain always in one direction on rotation of said restricting means in either direction, and means for reversing the drive of said first driving element each time said chain completes its run.

25. Apparatus for executing a series of operations repeatedly at uniform intervals comprising as a timing mechanism a plurality of units each consisting of a spur gear constituting a driving element, a spur gear constituting a driven element, both said spur gears being sun-gears, and an intermediate element in the form of a rotatable member carrying at least one pair of connected planetary spur gears each engaging with one of said sun-gears, whereby said elements are geared to one another so that if any one is held the other two may rotate in definite speed ratio to each other, said ratio between said driving and driven elements being a large ratio, said units being connected in series, driving element to driven element, an annulus surrounding each of said intermediate elements and the last driven element, a stop on each of said annuli adapted to limit the motion of the corresponding element, said annulus being rotatable so as to bring said stop to any selected position, and means for locking the several annuli in their selected positions, whereby said stops restrict the rotation of the several intermediate elements and of the last driven element of said series to any desired amount so as to permit any desired amount of rotation of the first driving element relatively to said annuli to take place and then to cause said driving element to drive said annuli, said apparatus further comprising a chain having a run passing a series of stations at which said series of operations are to be executed, means on said chain to execute an operation at one of said stations as said means pass said station, a driving connection between said chain and said restricting means adapted to drive said chain always in one direction on rotation of said restricting means in either direction, and means for reversing the drive of said first driving element each time said chain completes its run.

ROBERT ALFRED ARCHIBALD WILLENS.